United States Patent Office 3,360,334
Patented Dec. 26, 1967

3,360,334
METHOD OF PREPARING A DRY PLASTIC BY CALCINATION AND COMPRESSION
Rupert Allister Nottle, Glen Iris, Victoria, and Bernard B. Brown, Maroubra Junction, New South Wales, Australia, assignors to Imperial Chemical Industries of Australia and New Zealand Limited, Melbourne, Victoria, Australia, a company of Australia
No Drawing. Filed Sept. 4, 1964, Ser. No. 394,613
Claims priority, application Australia, Sept. 11, 1963, 35,272/63
4 Claims. (Cl. 23—122)

ABSTRACT OF THE DISCLOSURE

Method of preparing a dry plaster selected from the group consisting of $CaSO_4 \cdot \frac{1}{2}H_2O$ and $CaSO_4 \cdot xH_2O$ wherein $x$ is between 0 and about 0.65 comprising calcining dry $CaSO_4 \cdot 2H_2O$ gypsum and compressing under a pressure between 10,000 and 200,000 pounds per square inch either the dry $CaSO_4 \cdot 2H_2O$ or the plaster resulting from the calcination of the $CaSO_4 \cdot 2H_2O$. The pressure may be applied by passing the gypsum or the resulting plaster between parallel rotating rollers or by means of a plunger reciprocating within a passage of cross-section which diminishes towards the discharge end of the passage.

---

This invention relates to a process of manufacture of calcium sulphate hemihydrate type plaster suitable for the manufacture of high strength set plasters.

Large quantities of low grade calcium sulphate dihydrate (gypsum) are available in the form of by-products from chemical processes such as the decomposition of calcium phosphate with sulphuric acid, the so-called wet phosphoric acid process, or the desulphating of bitterns; another source of low grade calcium sulphate is the naturally occurring wind-blown gypsum. These low quality grades of gypsum are generally not suited as raw materials for the dry calcining process of manufacture of plaster for building and moulding purposes, because the particles of these low grades are small, too much water is required to be mixed with the plasters made from them in order to make a mix of standard consistency or fluidity and the ultimate compressive strength of the hydrated(set)plaster manufactured from them is low. The quantity of by-product calcium sulphate which has thus remained unused for many years is very substantial and the economic incentive to convert it into a useful product is considerable. Nevertheless, attempts to find an economic process of conversion of low grade gypsum into high grade plaster have hitherto failed, principally because gypsum suitable for conversion to high grade plaster is obtained readily at low cost from naturally occurring mineral deposits and thus only a simple, preferably one-step, process of conversion can compete economically.

The term "plaster" is defined in this specification as both calcium sulphate hemihydrate having approximately one half mole of water per mole of sulphate as well as soluble anhydrite $CaSO_4 \cdot xH_2O$, where the moles $x$ of the water associated therewith vary from nearly 0 to about 0.65. The product of mixing plaster with water and allowing to set is referred to as "set plaster."

The term "gypsum" is defined in this specification as calcium sulphate dihydrate.

The main property required of commercial plaster is that on mixing with water it yields a pure white set plaster having a high compressive strength; in Australia, the building industry specifies a minimum compressive strength of 1200 lbs. per square inch for plaster mixed, set and dried under standard conditions, as set out in "S.A.A. Int. 317— Australian Standards Specifications for Gypsum Plaster for Building Purposes." Plaster satisfying this specification is referred to below as "specification grade plaster."

It is known empirically that plaster requiring between 65 and 70 g. of water per 100 g. of plaster powder to make a mix of standard consistency satisfies this specification. A typical particle size distribution of plasters meeting this water requirement has been obtained by analysing two commercial samples, with the following result: 3 to 6% larger than 72 B.S.S.; 17 to 25% between 72 and 150 B.S.S.; 18 to 37% between 150 and 240 B.S.S.; and 32 to 62% smaller than 240 B.S.S. Plasters made from by-product gypsums have water requirements for standard consistency of up to 120 g. per 100 g. of plaster and the set plasters made from them usually have less than the required compressive strength of 1200 lb./sq.in., e.g. compressive strengths of the order of 700 to 900 lb./sq.in.

It is the principal object of the present invention to provide a process for the manufacture of plaster whereby commercially satisfactory plaster may be produced from by-product gypsum.

In order to achieve this object the present invention provides, in the process for the manufacture of plaster as herein defined by calcining gypsum as herein defined, the step of compressing the gypsum or the plaster under a pressure between 10,000 and 200,000 pounds per square inch.

The pressure is preferably between 10,000 and 40,000 pounds per square inch.

The compression may be effected continuously between parallel rotating rollers; or may be effected intermittently by means of a plunger reciprocating within a passage of cross-section diminishing towards the discharge end, as in the known apparatus for briquetting brown coal.

When the compacting is carried out prior to calcining a reduction of the water required for making a mix of standard consistency below 65 g. per 100 g. of plaster can be achieved only at pressures substantially greater than those required in the case of the reverse sequence of operations (calcining before compacting); for practical purposes a minimum water requirement is taken to be near 60 g. of water per 100 g. of plaster. On the other hand compacting before calcining has certain advantages; thus when fine gypsum, e.g. from the wet phosphoric acid process, is calcined in kettles, a large stream of steam is evolved and, with the existing equipment available in industry, substantial quantities of the fine plaster and/or gypsum powder are often entrained in the vapour stream. This powder is lost. Additional equipment for the separation and collection of the calcium sulphate powder from the vapour stream, for example cyclones, hoppers, and the like are therefore required or, alternatively, the rate of evaporation must be restricted and the process is thus retarded. When gypsum compressed before the calcining is used, the severe problem of entrainment of powder does not arise.

The technique by which the required pressure is attained is not narrowly critical. Thus, for experimental purposes the low quality plaster powder or gypsum powder may be charged into a thick-walled cylindrical steel tube, one end of which tube is closed e.g. by means of a screw cap and into the other, open end of which tube a steel plunger fits tightly. The plunger is pressed against the powder hydraulically, or by impact. The screw cap is then removed and the rod of compacted plaster is pushed out, comminuted and tested. In a similar manner individual bricks of compacted plaster can be manufactured in moulds. The technique of size enlargement by roller-compacting machines is known "per se" and has been described e.g. by B. E. Kurtz and A. J. Barduhn in the aritcle "Compacting Granular Solids," Chem. Eng. Progress, vol. 56, No. 1, pages 67–72 inclusive.

In carrying out the process of compacting between steel rollers we have found that the process is particularly advantageous for inferior grades of plaster which are characterised by a water requirement for standard consistency in excess of 7 g./100 g. of plaster and a compressive strength after setting of less than 1200 lbs./in.² The benefit of compaction is particularly marked at pressures between 10,000 and 40,000 lbs./in.² although further, progressively less marked improvement can be attained by increasing the pressure up to 200,000 lbs./in.² We have also found that commercial plaster satisfying the specification of compressive strength after setting (1200 lbs./in.²) and having a water requirement of 65 to 70 g. per 100 g. of plaster can be further improved by compaction, but the benefit of compaction is more marginal, as it is with the increase in pressure beyond 100,000 p.s.i. for all types of plaster. Thus, as Table II demonstrates, we have found that inferior plaster will meet the set strength specification (compressive strength of 1200 lbs./in.²) on compaction to 16,000 lbs. and can be further improved to set strengths of 2000 lbs./in.² at 40,000 p.s.i., 2400 lbs./in.² at 76,000 p.s.i. and 2900 lbs./in.² at 140,000 p.s.i. Commercial plaster "A" satisfying the trade specification, on the other hand, could be improved further substantially only at pressures in excess of 20,000 p.s.i.

Accordingly we also provide a process of improving a plaster which would yield on hydration a set plaster having a compressive strength between 1200 and 1800 lbs./in.², which process comprises compacting said plaster at pressures between 20,000 and 200,000 lbs./in.² The compressed plaster may be then crushed and further comminuted.

Our process is now illustrated by, but not limited to, the following examples:

EXAMPLE 1

A sludge of calcium sulphate dihydrate with crystals 90% less than 70μ obtained from the desulphation of bitterns from South Australian salt fields was filtered on a centrifuge, washed, dried in an oven at 40° C. for 6 hours and lightly ground to break up large lumps. Samples of the resultant dry powder (about 100 g.) were inserted into a cylindrical die of 1 in. diameter closed by means of a screw plug at one end, into the other end of which a steel plunger fitted tightly. The plunger was compressed by means of a hydraulic press to a predeterminted pressure. The screw plug was then removed, the compacted gypsum was pushed out, crushed, ground and calcined at a temperature of 120° C., rising to 165° C. over a period of 2 hours to give material, the particle size distribution of which was within the range which we had found to be typical of commercial material as above described. Results are given in Table I.

TABLE I

| Compaction Pressure, p.s.i. | Water Requirement, g. water per 100 g. plaster | Dry Compressive Strenght of Set Plaster, p.s.i. |
| --- | --- | --- |
| Nil | 94 | 650 |
| 13,000 | 977 | |
| 19,000 | 70 | |
| 24,000 | 71 | |
| 35,000 | 63 | 1,480 |
| 76,000 | 63 | |

EXAMPLE 2

A sludge of fine precipitate of calcium sulphate dihydrate obtained from the desulphated bitterns from South Australian salt-fields was filtered on a centrifuge, washed, dried and calcined in an oven at a temperature of 110° C. rising to 180° C. over a period of 2 hours. Samples of the calcined plaster (about 100 g.) were inserted into a cylindrical die of 1 in. diameter closed by means of a screw plug at one end, into the other end of which a steel plunger fitted tightly. The plunger was compressed by means of a hydraulic press to a predetermined pressure. The screw plug was then removed, the compacted plaster was crushed, ground to a particle size distribution within the range above stated as typical of commercial plasters and the water requirement per 100 g. plaster, and the compressive strength of the dry set plaster, were determined. Results are given in Table II.

EXAMPLE 3

Example 2 was repeated using, however, gypsum by-product from the wet phosphoric acid process. Results are given in Table II.

EXAMPLE 4

The compacting process and grinding as described in Example 2 was repeated using, however, good quality commercial plaster "A," meeting the product specification. This example demonstrates that high pressures are capable of producing a further product improvement on commercially satisfactory material. Results are given in Table II.

EXAMPLE 5

Experiment 4 was repeated using a lower grade commercial plaster "B." The experiment demonstrates that lower grade plaster of mineral origin may be further improved by the present process. Results are given in Table II.

TABLE II

| Type of Plaster | Compaction Pressure, p.s.i. | Water Requirement, g. water per 100 g. plaster | Dry Compressive Strenght of Set Plaster, p.s.i. |
| --- | --- | --- | --- |
| Example 2. Fine precipitated gypsum from desulphated bittern, ground, calcined, compacted and ground. | Untreated | 87 | 850 |
| | 2,500 | 78 | 900 |
| | 8,000 | 72 | 950 |
| | 16,000 | 68 | 1,250 |
| | 19,000 | 66 | 1,400 |
| | 25,000 | 66 | 1,570 |
| | 30,000 | 62 | 1,800 |
| | 40,000 | 60 | 2,000 |
| | 76,000 | 55 | 2,400 |
| | 150,000 | 44 | 3,300 |
| Example 3. Gypsum from wet phosphoric acid, ground, calcined, compacted and ground. | Untreated | 115 | 650 |
| | 25,000 | 69 | 1,490 |
| | 32,000 | 60 | 2,200 |
| | 153,000 | 49 | 2,900 |
| Example 4. Commercial "A" (good quality grade). | Untreated | 63 | 1,700 |
| | 13,000 | 64 | 1,800 |
| | 19,000 | 63 | 1,800 |
| | 40,000 | 58 | 2,400 |
| | 150,000 | 50 | 3,400 |
| Example 5. Commercial "B" (lower quality grade). | Untreated | 90-100 | 850 |
| | 13,000 | 71 | |
| | 19,000 | 69 | 1,230 |

EXAMPLE 6

A continuous sheet of compacted plaster was produced on a semi-technical scale in the following manner. The compacting machine consisted of a pair of horizontal, parallel, smooth cast iron rolls, 24" diameter and 24" effective length, rotating face to face. By hydraulic control the pressure on the pistons acting on the roll bearings was adjusted to the desired value. The uncompacted material was fed from above, through an enclosed channel, into the nip of the rolls and drawn between the rolls where it was compacted into a continuous sheet emerging from the bottom of the rolls. At a total bearing load of 130,000 lbs., plaster sheet of 2 ft. width and 1/8 in. thickness was produced at the rate of 5 tons per hour, compacted at a pressure of 25,000 p.s.i. and using a power input of about 30 H.P. The compacted sheet was broken into flakes and then ground to give a plaster powder, of a particle size distribution within the range stated above to be typical of commercial plaster. The water requirement of the finely ground plaster was 63 g. of water per 100 g. of plaster and the compressive strength of the plaster after setting was 1700 lbs./in.$^2$

EXAMPLE 7

Experiment 6 was repeated using, however, a two stage compression process. Initially the bearing load was set to 65,000 pounds and a 5 ft. long sheet compressed under 12,500 p.s.i. was obtained. This was fed back to the rollers at an increased bearing load of 130,000 pounds, thus producing a further compression to 25,000 p.s.i. On crushing, grinding and hydrating, plaster of compressive strength of 1700 p.s.i. was obtained.

We claim:
1. In a process wherein dry calcium dihydrate is calcined to form a dry plaster selected from the group consisting of calcium sulphate hemihydrate and $CaSO_4 \cdot xH_2O$, wherein $x$ is between 0 and about 0.65, the improvement comprising compressing under a pressure between 10,000 and 200,000 p.s.i., the dihydrate or the plaster resulting from the calcining of the dihydrate.
2. The step in the process according to claim 1, wherein the pressure is between 10,000 and 40,000 pounds per square inch.
3. The step in the process according to claim 1, wherein the compression is effected continuously between parallel rotating rollers.
4. The step in the process according to claim 1, wherein the compression is effected intermittently by means of a plunger reciprocating within a passage of cross-section diminishing towards the discharge end.

References Cited

UNITED STATES PATENTS 1,652,162  12/1927  Brookby _____ 106—109
1,703,097  2/1929  Chassevent _____ 106—110 X

OTHER REFERENCES

Posnjak, "The System, $CaSO_4$–$H_2O$," American Journal of Science, V, vol. XXXV-A, 1938, pages 247–254.

EARL C. THOMAS, *Primary Examiner.*